United States Patent
Throop et al.

(10) Patent No.: US 9,619,169 B1
(45) Date of Patent: Apr. 11, 2017

(54) MANAGING DATA ACTIVITY INFORMATION FOR DATA MIGRATION IN DATA STORAGE SYSTEMS

(71) Applicants: Dean D. Throop, Efland, NC (US); Dennis T. Duprey, Raleigh, NC (US)

(72) Inventors: Dean D. Throop, Efland, NC (US); Dennis T. Duprey, Raleigh, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 436 days.

(21) Appl. No.: 13/632,099

(22) Filed: Sep. 30, 2012

(51) Int. Cl.
*G06F 3/06* (2006.01)

(52) U.S. Cl.
CPC .................. *G06F 3/0647* (2013.01)

(58) Field of Classification Search
None
See application file for complete search history.

(56) References Cited

U.S. PATENT DOCUMENTS

2013/0080703 A1\* 3/2013 Kumagai et al. ............. 711/117

\* cited by examiner

*Primary Examiner* — Baboucarr Faal
(74) *Attorney, Agent, or Firm* — Krishnendu Gupta; John T. Hurley

(57) ABSTRACT

A method is used in managing data activity information for data migration in data storage systems. Slice activity data for slices stored in a data storage system is identified. The slice activity data is divided into multiple subsets of slice activity data. A subset of slice activity data may be obtained and stored in working memory. The slice activity data may be updated to correspond to changes slice activity. After a determined time, the updated slice activity data is copied to a disk drive and the method is repeated with the next subset of slice activity data.

20 Claims, 8 Drawing Sheets

MANAGING DATA ACTIVITY INFORMATION FOR DATA MIGRATION IN DATA STORAGE SYSTEMS

BACKGROUND

Technical Field

This application relates to managing data statistics collection for data migration in data storage systems.

Description of Related Art

A traditional storage array (herein also referred to as a "disk storage array", "disk array", or simply "array") is a collection of hard disk drives operating together logically as a unified storage device. Storage arrays are designed to store large quantities of data. Storage arrays typically include one or more storage array processors (SPs), for handling both requests for allocation and input/output (I/O) requests. An SP is the controller for and primary interface to the storage array.

Storage arrays are typically used to provide storage space for one or more computer file systems, databases, applications, and the like. For this and other reasons, it is common for storage arrays to logically partition a set of disk drives into chunks of storage space, called logical units, or LUs. This enables a unified storage array to provide the storage space as a collection of separate file systems, network drives, and/or Logical Units.

Performance of a storage array may be characterized by the array's total capacity, response time, and throughput. The capacity of a storage array is the maximum total amount of data that can be stored on the array. The response time of an array is the amount of time that it takes to read data from or write data to the array. The throughput of an array is a measure of the amount of data that can be transferred into or out of (i.e., written to or read from) the array over a given period of time.

The administrator of a storage array may desire to operate the array in a manner that maximizes throughput and minimizes response time. In general, performance of a storage array may be constrained by both physical and temporal constraints. Examples of physical constraints include bus occupancy and availability, excessive disk arm movement, and uneven distribution of load across disks. Examples of temporal constraints include bus bandwidth, bus speed, spindle rotational speed, serial versus parallel access to multiple read/write heads, and the size of data transfer buffers.

One factor that may limit the performance of a storage array is the performance of each individual storage component. A storage system may include a variety of storage devices that balance performance and cost objectives. Different types of disks may be arranged whereby the like kinds of disks are grouped into tiers based on the performance characteristics of the disks.

For example, a fast tier (also referred to as "higher tier" or "high tier") may include a group of very fast solid state drives (SSDs) used to store a relatively small amount data that is frequently accessed. A medium tier (also referred to as "mid tier" or "middle tier") may include a group of fast hard disk drives (HDD) used to store a larger amount of less frequently accessed data but at a lower performance level that SSDs. A slow tier (also referred to as "lower tier" or "low tier") may include a group of slower HDDs used to store very large amounts of data with a still lower level of performance as compared to SSDs and fast HDDs. It may be possible to have different tiers with different properties or constructed from a mix of different types of physical disks to achieve a performance or price goal. Storing more frequently accessed or "hot" data on a fast tier and less frequently referenced accessed or "cold" data on a slow tier may create a more favorable customer cost/performance profile than storing all data on a single kind of disk. To provide data protection, tiers may be arranged in a variety of RAID (Redundant Array of Independent or Inexpensive Disks) configurations known in the art.

SUMMARY OF THE INVENTION

A method is used in managing data activity information for data migration in data storage systems. Slice activity data for slices stored in a data storage system is identified. The slice activity data is divided into multiple subsets of slice activity data. A subset of slice activity data may be obtained and stored in working memory. The slice activity data may be updated to correspond to changes slice activity. After a determined time, the updated slice activity data is copied to a disk drive and the method is repeated with the next subset of slice activity data.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
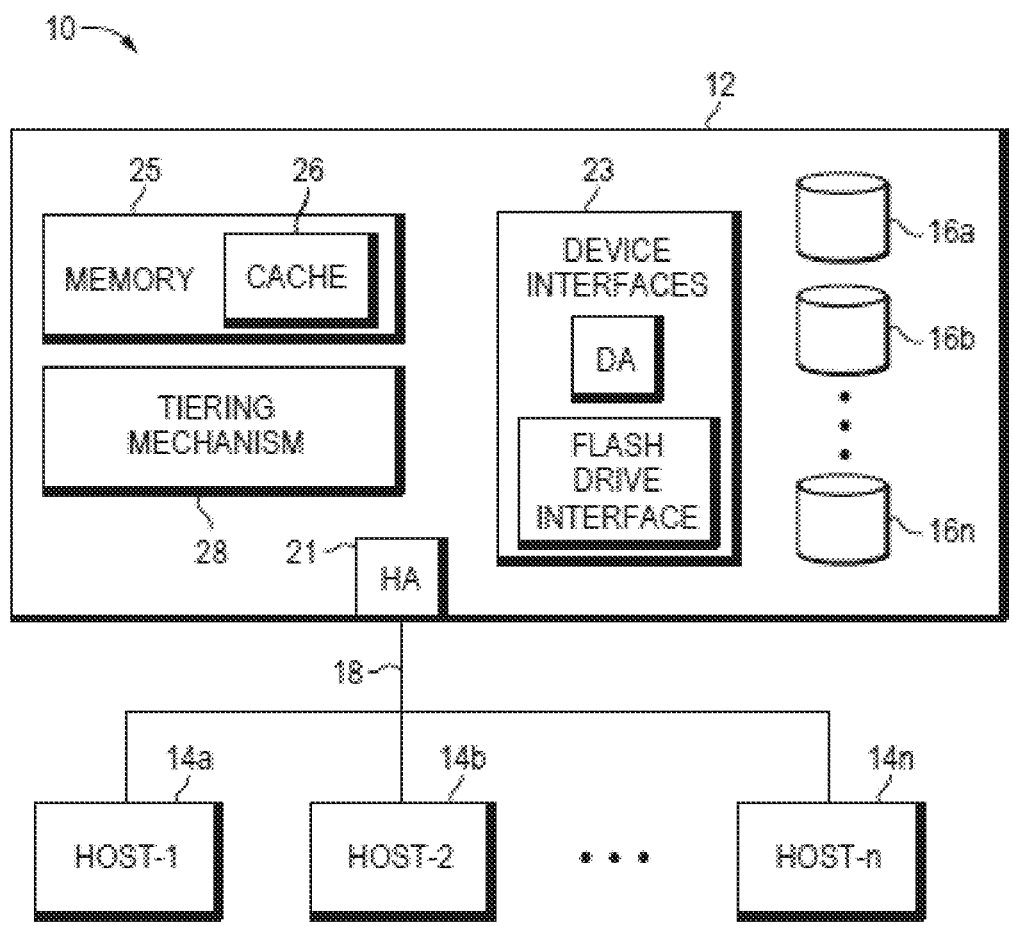
FIG. 1 is an example embodiment of a computer system that may utilize the techniques described herein.

Referring to FIG. 1, shown is an example of an embodiment of a system that may be used in connection with performing one or more implementations of the current techniques described herein. The system 10 includes a data storage system 12 connected to host systems 14a-14n through communication medium 18. In this embodiment of the computer system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwired or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. The communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such as a Connectrix or other switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not need to address the drives or devices 16a-16n of the storage systems directly, but rather access to data may be provided to one or more host systems from what the host systems view as a plurality of logical devices or logical units (LU). The LUs may or may not correspond to the actual physical devices or drives 16a-16n. For example, one or more LUs may reside on a single physical drive or multiple drives, or a variety of subsets of multiple drives. Data in a single data storage system, such as a single data storage array, may be accessed by multiple hosts allowing the hosts to share the data residing therein. The map kept by the storage array may associate host system logical address with physical device address.

The map associates logical addresses in the host visible LUs with the physical devices where the data actually is stored. The map also contains a list of unused slices on the physical devices that are candidates for use when LUs are created or when they expand. The map in some embodiments may also contains other information such as time last access for all or a subset of the slices or frequency counters for the slice; the time last access or frequency counters can be analyzed to derive the temperature of the slices.

The data storage system 12 in the embodiment of FIG. 1 further comprises a host adaptor (HA) 21 coupled to the hosts 14a-14n via the communication medium 18, device interfaces 23, memory 25, cache 26, and tiering mechanism 28. The device interfaces 23 may comprise device adaptors and interfaces (e.g., a flash drive interface). Additionally, the cache 26 may be connectable to the device interfaces 23 if the cache utilizes flash drives in addition to memory.

As described above, the data storage system 12 may be a data storage array including a plurality of data storage devices 16a-16n in which one or more of the devices 16a-16n are flash memory devices employing one or more different flash memory technologies. In one embodiment, the data storage system 12 may be a VMAX® data storage array and/or a VNX® data storage array by EMC Corporation of Hopkinton, Mass. In the foregoing data storage array, the data storage devices 16a-16n may include a combination of disk devices and flash devices in which the flash devices may appear as standard Fibre Channel (FC) drives to the various software tools used in connection with the data storage array. The disk devices may be any one or more different types of disk devices such as, for example, an ATA disk drive, FC disk drive, and the like. The flash devices may be constructed using different types of memory technologies such as nonvolatile semiconductor NAND flash memory forming one or more SLC (single level cell) devices and/or MLC (multi level cell) devices. Additionally, flash memory devices and disk devices are two exemplary types of devices that may be included in a data storage system used in connection with the techniques described herein.

Figure 2:
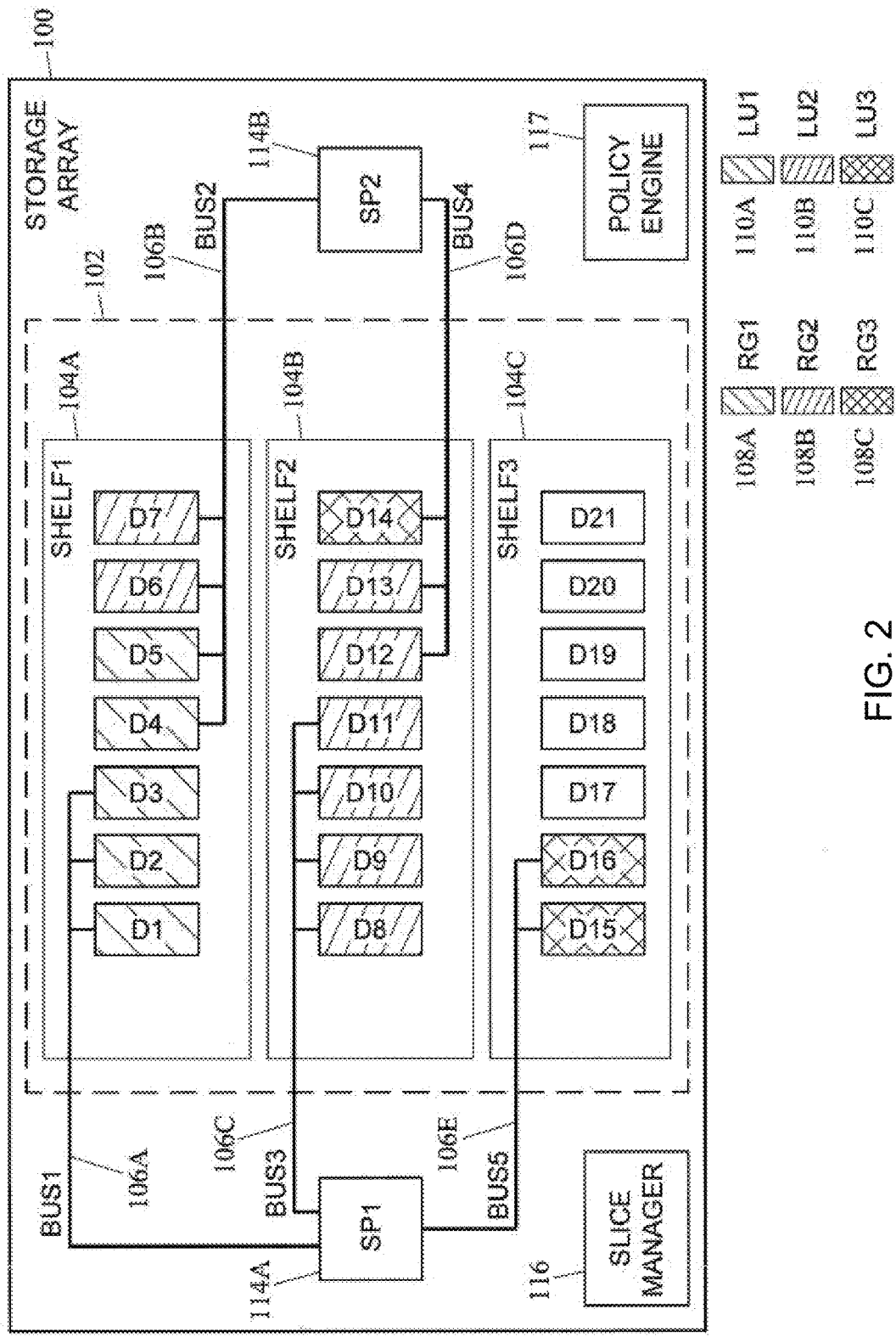
FIG. 2 is a block diagram illustrating an example embodiment data storage array that may utilize the techniques described herein.

Referring to FIG. 2, storage array 100 may include multiple storage devices 102, which are hard disk drives such as serial attached SCSI (SAS) drives, FibreChannel (FC) Drives, serial advanced technology attachment (SATA) drives, or some combination of the above. In one embodiment, storage devices 102 may be organized into multiple shelves 104, each shelf containing multiple storage devices 102. In the embodiment illustrated in FIG. 1, storage array 100 includes three shelves, Shelf1 104A, Shelf2 104B, and Shelf2 104CB. Shelves 104A-104C each containing seven storage devices, D1-D21. In one embodiment, each storage device 102 may be connected to one or more buses 106. In the embodiment illustrated in FIG. 2, each shelf 104 has two buses 106, at least one of which connects to every device 102 on each shelf 104. For example, Shelf1 104A has two buses, Bus1 106A and Bus2 106B, where Bus1 106A is connected to devices D1-D3 and Bus2 106B is connected to devices D4-D7. Similarly, Shelf2 104B has two buses, Bus3 106C and Bus4 106D, where Bus2 106C is connected to devices D8-D11 and Bus3 106D is connected to devices D12-D14. Lastly, Shelf3 104C has one bus, Bus5 106E, where Bus5 106E is connected to devices D15-D16. Remaining storage devices D17-D21 are not shown connected to any busses or associated with any RAID group for simplicity purposes only. It may be appreciated that the configuration of storage array 100 as illustrated in FIG. 1 is for illustrative purposes only and is not to be considered a limitation of the subject matter described herein.

In addition to the physical configuration, storage devices 102 may also be logically configured. For example, multiple storage devices 102 may be organized into redundant array of inexpensive disks (RAID) groups, or RGs 108, shown in FIG. 2 being differently shaded as RG1 108A, RG2 108B, and RG3 108C. Storage devices D1-D5 are shown organized into a first RAID group, RG1 108A, while storage devices D6-D13 are organized into a second RAID group, RG2 108B, and storage devices D14-D16 are organized into a third RAID group, RG3 108C. In one embodiment, a RAID group may span multiple shelves and/or multiple buses. Although RAID groups are composed of multiple storage devices, a RAID group may be conceptually treated as if it were a single storage device.

Storage devices 102 may be managed by one or more storage processors 114. Storage processors (SPs) 114 may be responsible for allocating storage and maintaining information about how that allocated storage is being used; maintaining the map may be done by the storage processors. Storage processors 114 may maintain information about the structure of the file system whose contents are being stored in the allocated slices. For example, SP1 114A may be connected to bus1 106A, bus3 106C, and bus5 106E for managing disks D1-D3, D8-D11, and D15-D16. Similarly, SP2 114B may be connected to bus2 106B, and bus4 106D for managing disks D41-D7, and D12-D14. It may be appreciated that multiple SPs can manage all disks/buses at the same time but may coordinate with each other.

In one implementation of storage array 100, each logical unit 110 may be associated with a slice allocation table (SAT), which is used to record information about each slice 112, such as the MLU that is using the slice 112 and whether the slice is free or allocated. The SAT may be stored in the logical unit 110, or it may be stored outside the logical unit 110 to which it is associated. Additional details regarding slice relocation and tiered data storage arrays are disclosed in U.S. patent application Ser. No. 12/826,434, filed on Jun. 29, 2010 and entitled, "MANAGING MULTI-TIERED STORAGE POOL PROVISIONING" and U.S. patent application Ser. No. 12/824,816, filed on Jun. 28, 2010 and entitled, "METHODS, SYSTEMS, AND COMPUTER READABLE MEDIUM FOR TIER-BASED DATA STORAGE RESOURCE ALLOCATION AND DATA RELOCATION IN A DATA STORAGE ARRAY" which are incorporated by reference herein in their entireties.

Figure 3:
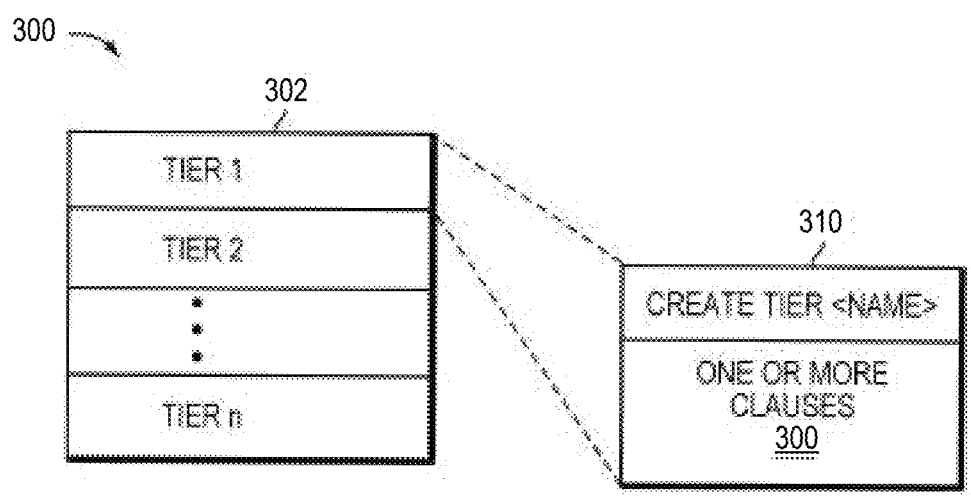
FIG. 3 is an example embodiment of storage tiering that may be used with the techniques described herein.

Referring to FIG. 3, shown is an example illustrating tiers. The example 300 includes a set of one or more tiers 302. Each tier, such as tier 1, may be creating by specifying a tier definition 310. In at least one embodiment, the tier definition 310 may include one or more lines of text in a language which may be subsequently processed by code on the data storage system. The tier definition 310 defines a tier indicated by <NAME>. The tier definition may include one or more clauses 320. The clauses of 320 may include one or more goal clauses and/or one or more configuration clauses.

Given that a storage system may be divided into tiers and that each tier can have different performance characteristics, the technique described herein helps enable management of data migration across the tiers. As described herein, the technique may facilitate migration of the hot data to the faster tiers and migration of the cold data to the slower tiers on a at a particular granularity level, (e.g., slice, LUN, pool) that may be chosen by a user or system software, such as a quality of service management logic.

Use of the current techniques can help provide such a system by migrating or moving the most used data to the quicker storage to improve user performance. The current techniques help enable this by categorizing data as hot or cold and migrating the hotter data to a tier with better performance data and migrating the less used colder data to a slower tier. The current techniques also help enable this to be an automated migration occurring without user management. The temperature of data is determined by analyzing how often that data is accessed. For example, the temperature may be given by a mapping corresponding to the number of times a particular slice of data was accessed in a given second or it may correspond to the response time of the accesses to the data or a combination of one or more of these attributes. Some implementations may choose to collect data only during time periods that are of particular interest; these maybe be setup by operator configuration or determined by host or storage system behavior.

Figure 4:
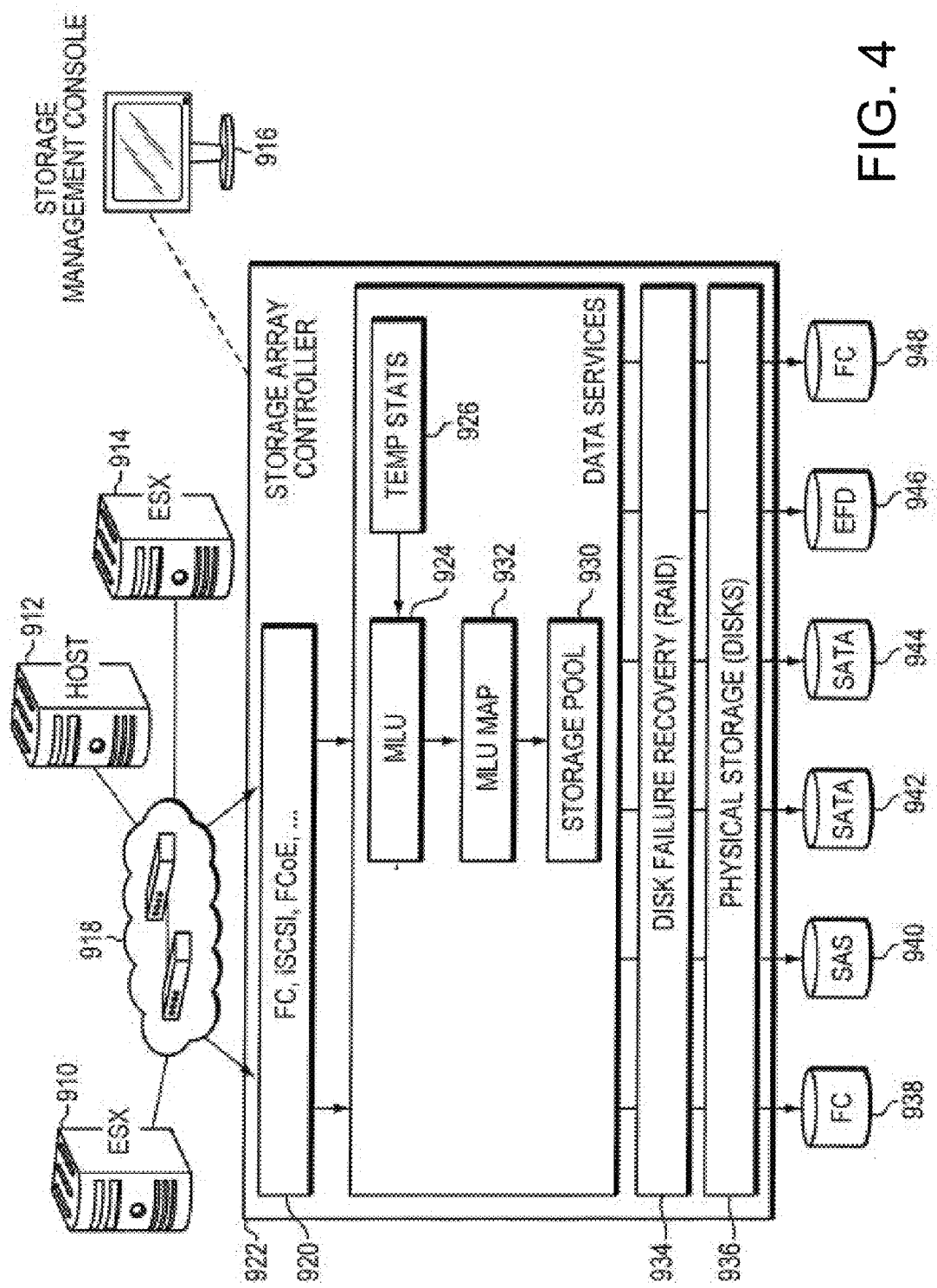
FIG. 4 is an example embodiment of a computer system in further detail that may utilize the techniques described herein.

FIG. 4 provides an overall diagram of an enhanced data storage system and environment. The techniques described herein may be incorporated into such system in any of a variety of ways. With respect to external connections, such system may have any I/O connection (e.g., Fibre Channel (FC), Serial Attach SCSI (SAS), or iSCSI) to host systems (e.g., server 912) and/or virtual environments (e.g., ESX servers 910, 914) by way of direct connect or data communications switch fabric 918. The storage system can be managed by way of a management console 916 that allows the administrator to monitor and control operation of the storage system. The storage system connects with physical disks such as Fibre Channel 938, 948, Serial Attach SCSI 940, Serial ATA 942, 944, or Enterprise Flash Drives (EFD) 946. The storage system uses the physical disks to persistently store data for the host systems.

With respect to storage system components, the storage system has a number of internal components including a storage array controller 922. An MLU map 932 with other components 920 handles connections (e.g., FC or iSCSI) with host systems and passes I/O, i.e., read or write requests, to a Mapped Logical Unit (MLU) component 924. The MLU provides the abstraction of a LUN to the host systems. As described below, the MLU makes use of the MLU map that identifies where the data is stored.

The storage system provides a mechanism 934 to help handle the failure of a physical storage 936 (e.g., disks) by using RAID algorithms to build logical abstractions of storage from physical disks. Such mechanisms provide for continued access to such logical abstractions even when a disk has failed and the system is mitigating the failure with the RAID algorithms. The logical abstraction presented by the RAID algorithms can be structured into uniform size units called slices with all the slices on a set of disks considered to be a storage pool (e.g., pool 930). The storage pool is thus an abstraction of RAID protected uniform size objects called slices.

The set of slices in the storage pool that are allocated for use for a particular user LUN is called a sparse meta volume. When a MLU needs additional space, the MLU asks the storage pool to allocate another slice from a free slice list and the MLU then adds the slice to the sparse meta volume for the MLU.

The MLU map is a multi level hierarchal directory of pointers to data. As the size of the data increases, the number of levels increases as well. The MLU uses the MLU map to look up where data has been saved. In at least some cases, the first levels are indirect blocks (e.g., block 952) which identify other levels of the directory. Eventually the directory entries identify the lowest level of the indirect blocks which point to the actual location for the data.

As mentioned above, the MLU and MLU map provide the abstraction of a LUN to host systems. Additional information regarding MLU abstraction can be found in U.S. patent application Ser. No. 12/751,455, entitled "MANAGING COMPRESSION IN DATA STORAGE SYSTEMS", filed 31 Mar. 2010 which application is hereby incorporated herein in its entirety.

Figure 5:
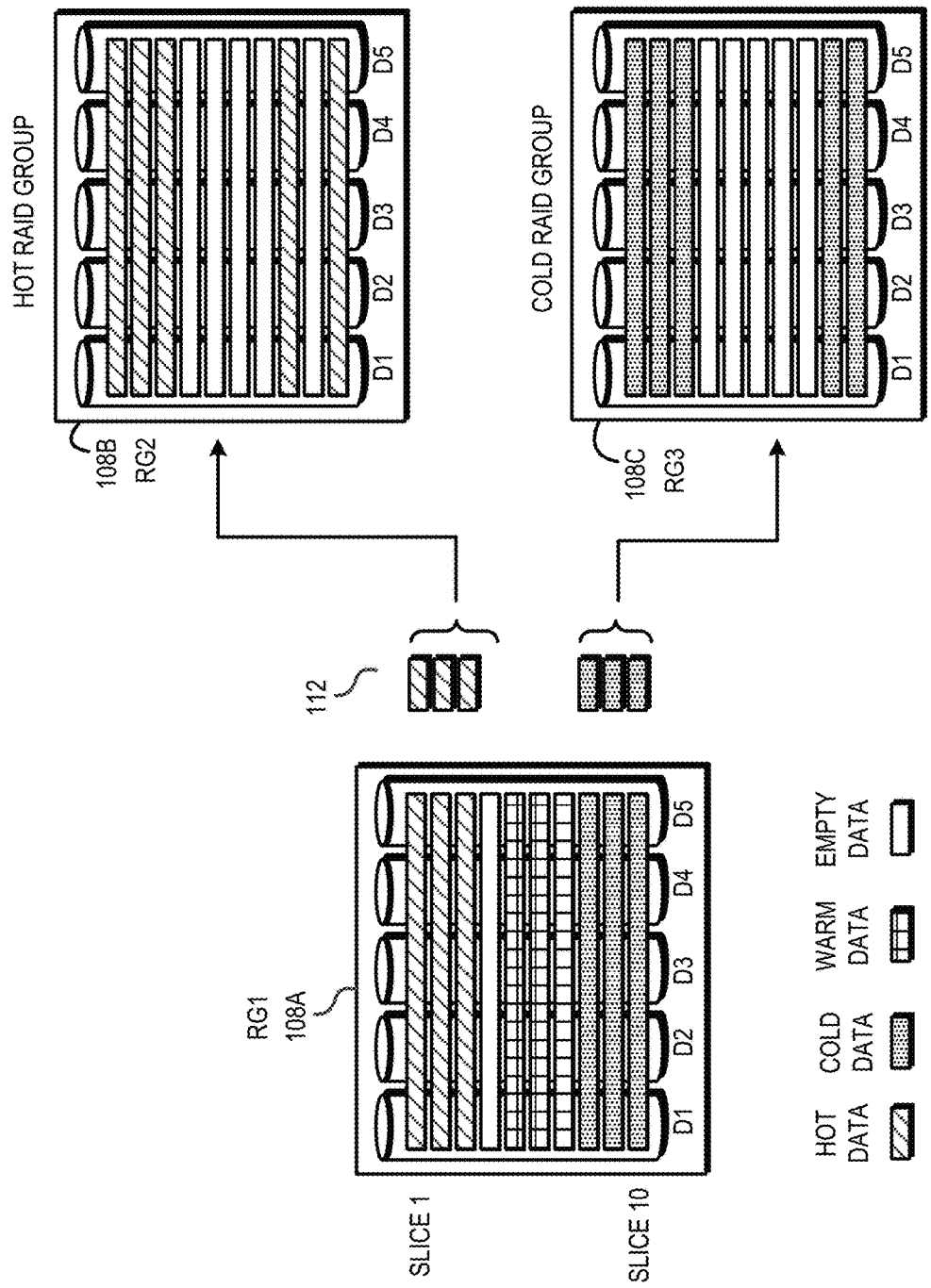
FIG. 5 is an example embodiment illustrating slice migration that may utilize the techniques described herein.

FIG. 5 is a diagram of an exemplary scenario for relocating hot data to a RAID group designated to hold hot data and relocating cold data to a RAID group designated to hold cold data illustrating relocating mapped data. For example, storage entities 102 described above, which may refer to a RAID group having one or more storage device(s), may be further subdivided into logical units. A single RAID group may contain one or more logical units (LUs) 110. In the embodiment illustrated in FIG. 5, RAID groups 108 also correspond to LUs 110. For example, RG1 108A may correspond to LU L1 110A, RG2 108B may correspond to LU L2 110B, and RG3 108C may correspond to LU L3 110C. It may be appreciated, however, that RAID groups need not correspond to LUs and that RAID groupings may be further divided into two or more LUs without departing from the scope of the subject matter described herein.

In addition to RAID groups, each logical unit 110 may be further subdivided into slices 112. In the embodiment illustrated in FIG. 2, RG1 108A/LU1 110A is shown divided into ten slices 112, SLICE1-SLICE10. Slices 112 may be allocated, de-allocated, re-allocated, reserved, or relocated by slice manger 116. A slice may be, for example, a 1 GB slice of data. However, the techniques described herein should not be construed as being limited to only slices of data; the techniques are equally applicable to other data chunk sizes, such as blocks, slivers (subset of slices), page, file or the like.

Slice manager 116 may be a software application or layer that is executed, at least in part, by one or more SPs 114. Slice manager 116 may be responsible for implementing a slice allocation policy. For example, slice manager 116 may receive slice allocation requests, service slice allocation requests, and maintain relevant activity information regarding slices.

In addition to the three states mentioned above (hot/warm/cold) for data, data may be associated with a temperature value used as input to a policy manager for determining where the data should be stored. Thus, different data may have different temperatures such as hottest, hotter, hot, warm, cold, colder, coldest, or anything in between.

Alternatively, data temperature may be indicated using an arbitrary metric such as 0 degrees to 100 degrees and power-versus-performance management policies may use this metric for determining whether data should be relocated to particular drives. For example, an administrator may set a policy such that data warmer than 30 degrees and colder than 70 degrees should be relocated onto warm drives or the administrator may set a policy such that only data colder than 20 degrees should be relocated onto cold drives. It should also be appreciated that data temperature may decay over time such that a single or burst I/O request for a particular piece of data may raise the temperate only slightly. If the data continues to be requested, the temperature may continue to rise or, conversely, if no further I/O requests for the data are observed the temperature of the data may drop over time.

In another alternative example embodiment, the system may be configured to sort the slices by temperate and migrate the hottest data to a fast tier and the coldest data on a slow tier. The distribution of slices may be modified by reference information to balance reference distribution so as to avoid over or under loading any particular tier.

Referring to the example slice relocation scenario shown in FIG. 5, data may be stored on slices 1-3 and 5-10 of disk drive RG1. Based on frequency of access, it may be determined that slices 1-3 contain hot data, slices 5-7 contain warm data, and slices 8-10 contain cold data. Further, RAID group RG2 108B may be designated as a hot RAID group and RAID group RG3 108C may be designated as cold RAID group. Based on these determinations, slice manager 116 may relocate cold slices to cold RAID groups in order to consolidate cold data onto drives configured to be spun down in order to conserve power. For example, continuing the illustrated scenario, the data associated with cold slices 8-10 may be moved to slices 1-3 of cold RAID group RG3 while hot slices 1-3 of RG1 may be migrated to slices 1-3 on hot RAID group RG3. The remaining warm data slices may be left where they are. As a result, RG1 may now be identified as a warm RAID group.

In another example scenario, warm data may become hot data after it has been accessed frequently enough to satisfy the conditions for relocation to a hot RAID group based on the prevailing policy. For example, assuming that data associated with warm slice 6 on RG1 has been requested enough times in a given time period to satisfy the threshold set by the administrator of array 100 to be classified as hot data, slice manager 116 may relocate the data to hot slice 8 of hot RAID group RG2. Alternatively, or in addition, temperate of a slice in a lower tier may rise higher than the temperature of a slice in a higher tier. In this case, implementing the system sorting embodiment discussed above, the sorting would indicate that the slices may be exchanged.

Depending on the desired system performance, it may be desirable to relocate the now hot data to a hot RAID group. In this way, system performance may be improved in that the hot RAID group may be a higher tier as well as avoiding the need to reconstruct data on a spun down redundant drive. Alternatively, in other embodiments, the hot data may remain on the RAID group RG1. It should be noted that the decision to move a slice to a different tier may require moving a slice out of the intended tier prior to moving the slice to the tier.

Similarly, warm data may become cold data if its access rate drops enough to satisfy the conditions for relocation to a cold RAID group based on the prevailing policy. In this situation, the cold data may be migrated to a cold RAID group using the relocation technique described above.

Figure 6:
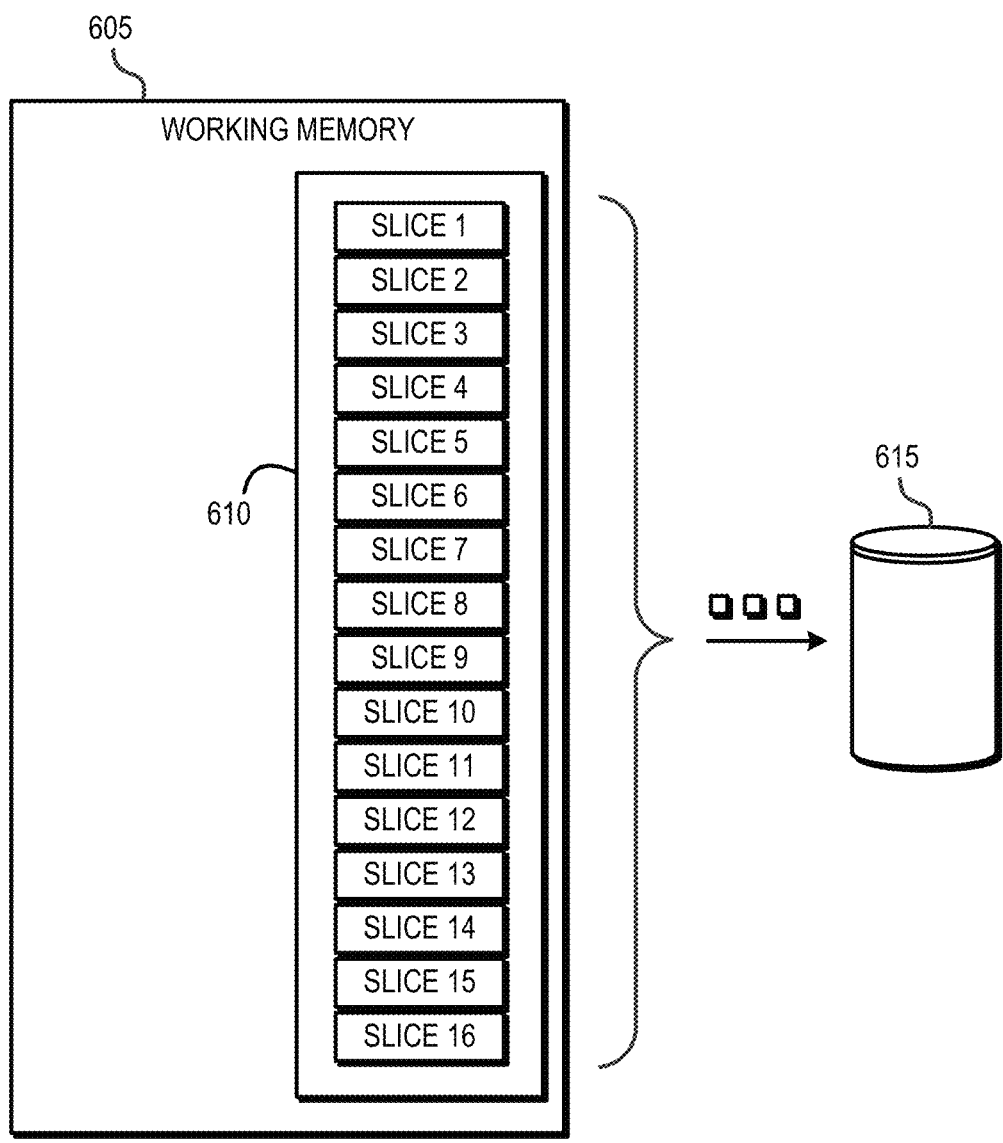
FIGS. 6 and 7 are example embodiments utilizing techniques described herein.

FIG. 6 illustrates a method of managing slice activity data. In this example, each slice has activity data 610 that may be maintained in working memory 605 as a table. Example slice activity data (also referred to as statistical data) may include I/O count information based on read/write counts and average latency of the slice. This information may be used to determine the temperature of the slice for relocation as described above. This information may also be used, for example, to migrate high activity data (i.e., hot data) to a higher tier comprising fast storage devices (e.g., Flash drives). Similarly, low activity data (i.e., cold data) may be migrated to a lower tier comprising slow storage devices (e.g., SATA drive). The activity information may be modified as slice data is read from or written to thereby potentially changing the slice's I/O count and latency.

To prevent loss of this information due to, for example, a system failure or abnormal shutdown, the activity information 610 associated each slice may be periodically written to a hard drive 615. With a RAID configuration such as that described above, the slice activity data is protected in the event of a disk failure. Updating the information may include simply copying existing unchanged information or computing the activity change since the last update, and may incorporate the difference as an exponential running average. The data storage system may periodically use the updated statistics to calculate how to migrate data within the storage system to better balance hot data on fast drives and cold data on slower drives.

This method may be sufficient for conventional data storage systems as working memory may be sufficiently large to hold slice activity data for each for a moderate number of slices. However, disk drives continue to increase in capacity. For example, 8 TB disk drives are now available. Modern data storage systems may include thousands of these disk drives dramatically increasing the capacity of such systems. However the size of working memory 605 has not increased the corresponding rate. Consequently, the amount of space required to store slice activity data for a significantly larger number of slices may exceed the capacity of working memory. Furthermore, the ability to use less working memory while still providing an effective slice migration process may provide a competitive advantage.

Figure 7:
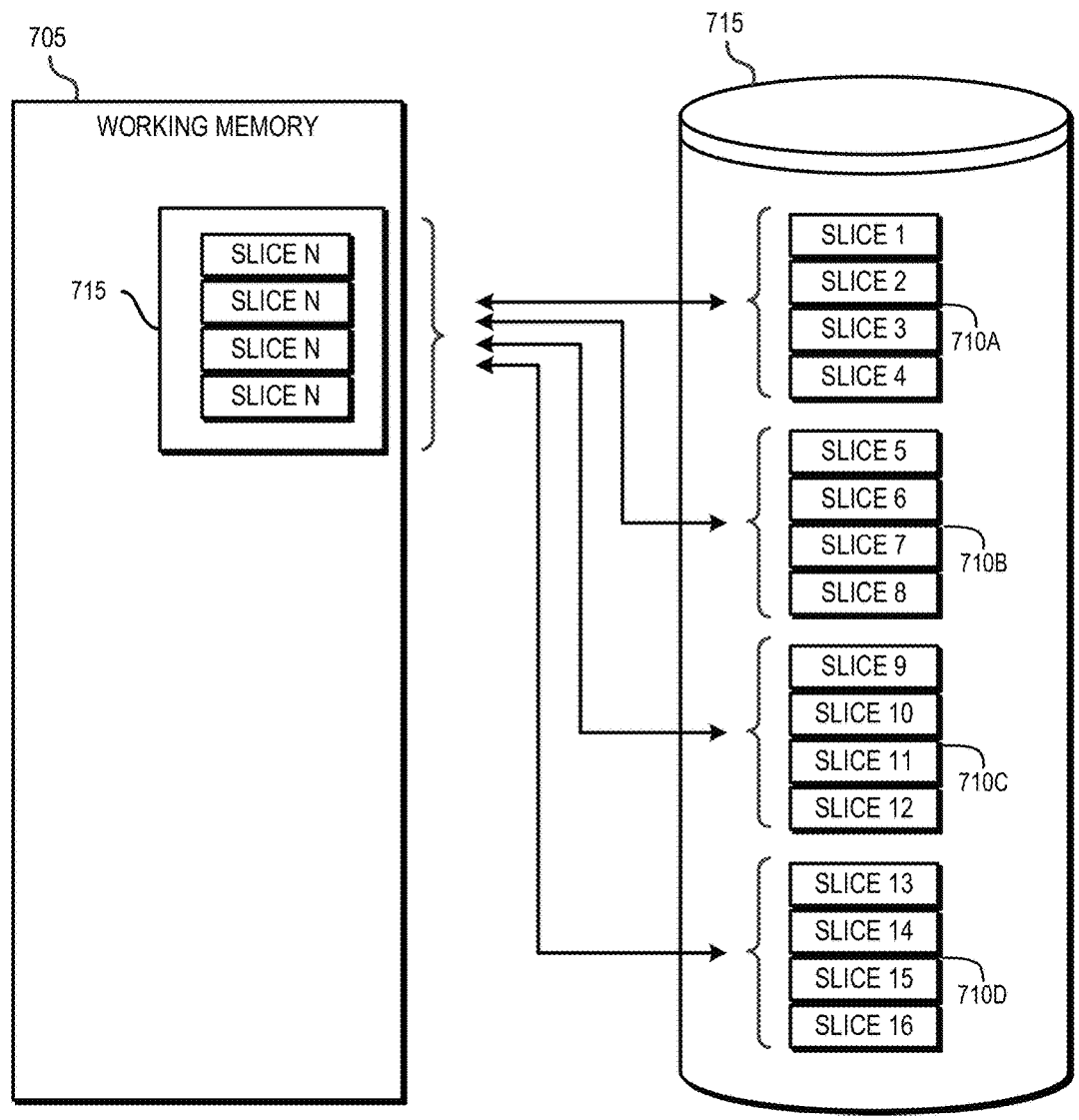

FIG. 7 illustrates an example embodiment implementing techniques for managing slice activity data in high-capacity data storage systems. In this embodiment, subset of slice activity data 715 may be stored in a significantly reduced amount working memory 705 and processed in a manner similar to that as described above were activity data is maintained and updated as necessary to reflect any activity or temperature change. However, in this example rather than storing slice activity data for all slices (which may not be possible in large capacity storage systems) a subset of slice activity data 710A is stored in working memory 705 and processed as described above. For example, the slice activity data may be partitioned into four subsets 710A, 710B, 710C, 710D. Although this example illustrates four subsets, the techniques described herein should not be construed as being limited as such and any convenient number of subsets may be used. For example, eight subsets may be used to facilitate modulo functions.

After a determined amount of time or given amount of data I/O activity, subset 710A, currently stored in a section of working memory 715, may be periodically written to a hard drive 715 for persistent storage. After the subset's 710A slice activity data has been written to the hard drive 715, the next slice activity data subset 710B may be obtained and stored in working memory 705 by storing it in essentially the same location 715 where subset 710A was stored. This next subset 710B is processed in a like manner for substantially the same amount of time or activity level as was the case for subset 710A. After the determined amount of time or activity has occurred, subset 710B may be written to the hard drive 715. The technique continues with the next slice activity data subset 710C, obtaining and copying it to working memory, updating the data in 710C in working memory 705 as necessary. After the determined amount of time or activity has occurred, subset 710C is copied to the hard drive 715. The last subset of data 710D is copied to working memory 705, updated as described above and after the determined time or activity has elapsed, the subset is copied out to the hard drive 715. The technique may continue cycling through the subsets of slice activity data in a round robin fashion such that each subset of activity data stored on the hard drive 715 is continually updated. Thus, implementing the techniques described herein may significantly reduce the amount of working memory necessary to support storage tiering.

The recorded activity data may be correlated and averaged out to provide an approximation of how often slices are referenced thereby providing an indication of slice temperature. Cycling through the subset of slice data in a regular manner, where activity information is correlated and averaged may provide sufficient information to effectively ensure proper slice migration while significantly reducing the amount of working memory necessary to maintain and process slice activity data.

In an alternative example embodiment, the selection of which subset of slice activity data to move into working memory 705 may be modified in a manner such that data stored on high tier storage devices may be more heavily weighted than data stored on lower tier storage devices. For example, consider the case of eight subsets of slice activity data where subsets 1-6 are stored on lower tier devices and subsets 7-8 are stored on high tier devices. Since the higher tier devices are faster and more expensive and may impact system performance more than lower tier devices, the higher tier devices may be more heavily weighted. For example, the subsets may be selected in the following sequence such that the technique cycles through selecting sets in the following order: 1, 7, 2, 8, 3, 7, 4, 8, 5, 7, 6, 8. In this manner, fast disks are monitored more frequently, thus, weighting the higher tiers more heavily. This may increase the accuracy for faster, more expensive tiers, as well as improving overall system performance.

Other example embodiments may be implemented where the criteria for obtaining or selecting a particular subset may be based on a user provided or system provide policy where other criteria may be considered. For example, subsets may be obtained based on an activity level, time, application, host, LUN, or choosing subsets that has experienced more changes relative to other subsets. Other criteria may be similarly contemplated.

Figure 8:
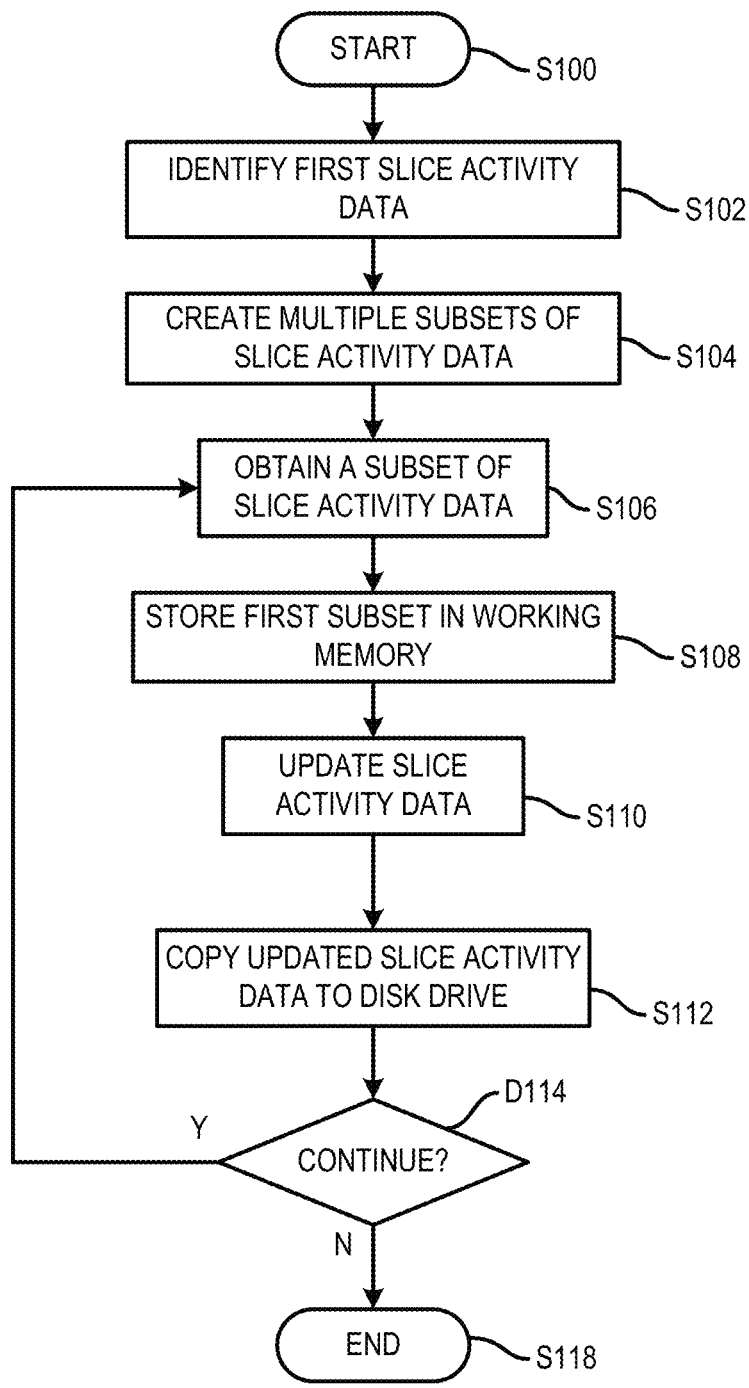
FIG. 8 is a flow diagram illustrating a process that may be used in connection with techniques described herein.

FIG. 8 is a flow diagram that illustrates an example method for managing data activity information for data migration in data storage systems similar to that shown in FIG. 7. While various methods disclosed herein are shown in relation to a flowchart or flowcharts, it should be noted that any ordering of method steps implied by such flowcharts or the description thereof is not to be construed as limiting the method to performing the steps in that order. Rather, the various steps of each of the methods disclosed herein can be performed in any of a variety of sequences. In addition, as the illustrated flowcharts are merely example embodiments, various other methods that include additional steps or include fewer steps than illustrated are also within the scope of the present invention.

As shown, the method can begin with a step S100. The method can be initiated manually by a user, for example, by entering a command in a command-line-interface or by clicking on a button or other object in a graphical user interface (GUI). The method can also be initiated automatically by storage management software and/or can be scheduled to run automatically at certain dates and times. In one embodiment, a storage system can be configured to execute the method of FIG. 7 for a pre-determined number minutes, hours, etc., or in a sequential or semi-sequential manner. Execution of the method can also be based on various user-specified constraints. For example, a user can specify the number of subsets to create and/or the sequence at which the subsets are managed. A user can also specify weighting for one or more tier types (i.e., level or performance) to be considered during the process so that one or more subsets of slice activity data stored on higher performance storage is more frequently updated.

The method may further include a step S102 where slice activity data for slices stored in the data storage system may be identified. In step S104, the method may further include creating multiple subsets of slice activity data by dividing the overall number slices into a number of smaller groups of slice activity data. For example, the number of slices may be divided into a group of eight subsets to facilitate modulo operations. Higher or lower numbers of subsets may be similarly created taking into consideration working memory, total number of slices, performance characteristics, and other systems parameters. In step 106, the method may obtain the next appropriate subset of data. For example, the first determined subset may be obtained, then the next subset and so on in a sequential or round robin manner. Alternatively, subsets may be chosen by weighting slices stored on higher tier storage more frequently. In step S108, the obtained subset is store in working memory. While in working memory, the subset is processed in a manner as described above with regard to determining slice temperature and migrating slices to a different tiers as appropriate.

In step S110, slice activity data may be updated to reflect slice activity changes in a manner as described above. At step S112, after a determined time has elapsed, the updated slice activity data may be copied to a disk drive for persistent storage. At step D112, if the process is to continue, the method returns to step S106 in repeats steps S108, S110, S112, and D114 as necessary. If not, the method may end at step S118.

It should be noted that execution of the method may be dependent on receiving permission from a system administrator or process. The administrator may have the ability to start, monitor, and stop the method at their discretion. Alternatively, or in addition, the method may be automatically started, monitored and stopped by the storage processor or other high level procedure.

The subject matter described herein for relocating mapped data to facilitate drive spin down in data storage systems may be implemented in hardware, software, firmware, or any combination thereof. As such, the terms "system" or "logic" as used herein may refer to hardware, software, or software in combination with hardware and/or firmware for implementing the feature being described. In one example implementation, the subject matter described herein may be implemented using a non-transitory computer readable medium having stored thereon computer executable instructions that when executed by the processor of a computer perform steps.

Exemplary non-transitory computer readable media suitable for implementing the subject matter described herein include disk memory devices, chip memory devices, programmable logic devices, and application specific integrated circuits. In addition, a computer program product that implements the subject matter described herein may be located on a single device or computing platform or may be distributed across multiple devices or computing platforms.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing data activity information for data migration in data storage systems, the method comprising:
    identifying slice activity data for each of a plurality of slices, wherein the slice activity data and the corresponding plurality of slices are stored on multiple non-volatile back-end drives arranged in a redundant array of independent disks (RAID) configuration in a data storage system, the data storage system including a volatile working memory wherein the amount of storage space for storing the slice activity data exceeds the capacity of the volatile working memory;
    dividing the identified slice activity data into multiple subsets of slice activity data;
    for each individual subset of slice activity data, selecting the set of slice activity data and performing a set of steps comprising:
        obtaining a first subset of slice activity data from non-volatile back-end drives;
        storing the subset of slice activity data in volatile working memory;
        updating slice activity data stored in the volatile working memory to correspond to changes in the corresponding slice activity;
        copying, after a determined time period, the updated slice activity data back to the non-volatile back-end drives; and
    periodically repeating the set of steps on the remaining subsets of slice activity data in the set of slice activity data.

2. The method of claim 1, wherein slice activity data includes I/O activity information and average latency of the associated data slice.

3. The method of claim 1, wherein obtaining a subset of slice activity data includes obtaining slice activity data stored on faster storage devices more frequently that slice activity data stored on slower storage devices.

4. The method of claim 1, wherein obtaining a subset of slice activity data includes determining the number of data activity changes for each subset of slice activity data and obtaining the subset of slice activity data having more changes relative to other slice activity data subsets.

5. The method of claim 1, wherein obtaining a subset of slice activity data is based on a user defined or system defined policy.

6. The method of claim 1, wherein updating slice activity data includes correlating or averaging slice activity data.

7. The method of claim 1, wherein the disk drive is a hard disk drive or a solid state drive.

8. The method of claim 1, wherein the determined time period is periodic, aperiodic or event driven.

9. The method of claim 1, dividing the slice activity data into multiple subsets of slice activity data includes dividing based on a parameter provided by a user.

10. A system for use in managing data activity information for data migration in data storage systems, the system comprising a storage processor and memory configured to:
   identify slice activity data for each of a plurality of slices, wherein the slice activity data and the corresponding plurality of slices are stored on multiple non-volatile back-end drives arranged in a redundant array of independent disks (RAID) configuration in a data storage system, the data storage system including a volatile working memory wherein the amount of storage space for storing the slice activity data exceeds the capacity of the volatile working memory;
   divide the identified slice activity data into multiple subsets of slice activity data;
   obtain a first subset of slice activity data from non-volatile back-end drives;
   store the subset of slice activity data in volatile working memory;
   update slice activity data stored in the volatile working memory to correspond to changes in the corresponding slice activity;
   copy, after a determined time period, the updated slice activity data back to the non-volatile back-end drives; and
   repeating the set of steps on the remaining subsets of slice activity data in the set of slice activity data.

11. The system of claim 10, wherein slice activity data includes I/O activity information and average latency of the associated data slice.

12. The system of claim 10, further configured to obtain slice activity data stored on faster storage devices more frequently that slice activity data stored on slower storage devices.

13. The system of claim 10, further configured to determine the number of data activity changes for each subset of slice activity data and obtain the subset of slice activity data having more changes relative to other slice activity data subsets.

14. The system of claim 10, further configured to obtain slice activity data based on a user defined or system defined policy.

15. The system of claim 10, further configured to correlate or average slice activity data.

16. The system of claim 10, wherein the disk drive is a hard disk drive or a solid state drive.

17. The system of claim 10, wherein the determined time period is periodic, aperiodic or event driven.

18. The system of claim 10, dividing the slice activity data into multiple subsets of slice activity data includes dividing based on a parameter provided by a user.

19. A non-transitory computer readable medium having stored thereon computer executable instructions that when executed by the processor of a computer perform steps comprising:
   identifying slice activity data for each of a plurality of slices, wherein the slice activity data and the corresponding plurality of slices are stored on multiple non-volatile back-end drives arranged in a redundant array of independent disks (RAID) configuration in a data storage system, the data storage system including a volatile working memory wherein the amount of storage space for storing the slice activity data exceeds the capacity of the volatile working memory;
   dividing the identified slice activity data into a set of slice activity data comprising multiple subsets of slice activity data;
   for each individual subset of slice activity data, selecting the set of slice activity data and performing a set of steps comprising:
      obtaining a first subset of slice activity data from non-volatile back-end drives;
      storing the subset of slice activity data in volatile working memory;
      updating slice activity data stored in the volatile working memory to correspond to changes in the corresponding slice activity;
      copying, after a determined time period, the updated slice activity data back to the non-volatile back-end drives; and
      periodically repeating the set of steps on the remaining subsets of slice activity data in the set of slice activity data.

20. The computer program product of claim 19, further including repeating the steps in a manner that cycles through slice activity data stored on faster storage devices more frequently that slice activity data stored on slower storage devices.

* * * * *